United States Patent [19]

Drexler

[11] Patent Number: 4,500,777
[45] Date of Patent: Feb. 19, 1985

[54] HIGH DATA CAPACITY, SCRATCH AND DUST RESISTANT, INFRARED, READ-WRITE DATA CARD FOR AUTOMATIC TELLER MACHINES

[75] Inventor: Jerome Drexler, Los Altos Hills, Calif.

[73] Assignee: Drexler Technology Corporation, Mountain View, Calif.

[21] Appl. No.: 566,966

[22] Filed: Dec. 29, 1983

Related U.S. Application Data

[63] Continuation of Ser. No. 492,691, May 11, 1983, , which is a continuation of Ser. No. 238,833, Feb. 22, 1981, abandoned.

[51] Int. Cl.³ ............................................. G06K 19/00
[52] U.S. Cl. .................................. 235/487; 235/382.5; 235/488; 235/468
[58] Field of Search ............... 235/468, 379, 487, 488, 235/382.5; 358/128.5; 346/76 L

[56] References Cited

U.S. PATENT DOCUMENTS

| | | | |
|---|---|---|---|
| 3,761,683 | 9/1973 | Rogers | 235/61.7 B |
| 3,788,617 | 1/1974 | Barney | 235/61.12 M |
| 3,829,662 | 8/1974 | Farahashi | 235/61.12 R |
| 3,858,031 | 12/1974 | Kornfeld | 235/61.11 E |
| 3,873,813 | 3/1975 | Lahr et al. | 235/61.12 N |
| 3,919,447 | 11/1975 | Kilmer, Jr. et al. | 438/138 |
| 4,013,894 | 3/1977 | Foote et al. | 250/569 |
| 4,044,231 | 8/1977 | Beck et al. | 235/61.12 |
| 4,066,873 | 1/1978 | Schatz | 235/487 |
| 4,085,314 | 4/1978 | Schultz et al. | 235/487 |
| 4,092,526 | 5/1978 | Beck | 235/487 |
| 4,157,784 | 6/1979 | Grottrup et al. | 235/491 |
| 4,190,843 | 2/1980 | Spong | 346/76 L |
| 4,197,986 | 4/1980 | Nagata | 235/379 |
| 4,202,491 | 5/1980 | Suzuki | 235/491 |
| 4,209,804 | 6/1980 | Dil | 235/487 |
| 4,224,666 | 9/1980 | Giraud | 235/487 |
| 4,230,939 | 10/1980 | de Bont | 235/488 |
| 4,237,375 | 12/1980 | Granholm | 235/487 |
| 4,300,143 | 11/1981 | Bell | 346/76 L |
| 4,304,990 | 12/1981 | Atalla | 235/379 |
| 4,305,081 | 12/1981 | Spong | 346/76 L |
| 4,313,188 | 1/1982 | Bartolini | 346/76 L |
| 4,345,261 | 8/1982 | Wilkinson | 346/76 L |
| 4,357,616 | 11/1982 | Terao | 346/76 L |

Primary Examiner—Harold I. Pitts

[57] ABSTRACT

A data card having an optical, high resolution reflective laser recording material, such as a metallic film adhered thereon. The strip of laser recording material has a capacity for recording at least 250,000 bits represented by bits having a dimension less than 50 microns. The data card is used in electronic passbook banking or identification uses.

3 Claims, 4 Drawing Figures

HIGH DATA CAPACITY, SCRATCH AND DUST RESISTANT, INFRARED, READ-WRITE DATA CARD FOR AUTOMATIC TELLER MACHINES

This is a continuation of co-pending application Ser. No. 492,691 filed May 11, 1983, which is a continuation of Ser. No. 238,833 filed Feb. 22, 1981, now abandoned.

TECHNICAL FIELD

The invention relates to personal identification cards and more particularly to a data card which can be used in an automatic teller machine and the like.

BACKGROUND ART

In metropolitan areas, electronic fund transfer systems allow bank customers to transact business at all hours of the day and from many locations. However, one of the problems which is encountered is with security. Normally, a bank has centralized data processing and all automatic teller machines (ATMs) are linked to this computer (CPU) by dedicated communication lines, such as telephone or microwave links.

Frequently, for purposes of security, the ATM is installed within the walls of the bank. This is done for two reasons. First, the ATMs have a lot of money. Second, access to the ATMs is strictly controlled, including access to the communication links. Thus, there is not only a requirement for physical security on account of the money involved, but there is also a requirement for communications security because communication devices grant access to the money. It is widely recognized that communications security is one of the weak links in ATM banking. In order to improve communications security, most banks have adopted data encryption between the ATM and the CPU. The problem with data encryption is that it makes system maintenance more complicated and makes the ATM machines themselves more cumbersome. Furthermore, a new security problem is created, namely security for the encryption system. The security for the cryptographic devices must be almost as great as for the ATM itself, since these devices contain the clear data. A solution is to build such devices into the ATM so that data emerging from the ATM is encrypted.

While encrypted ATMs are now used in large metropolitan areas, electronic fund transfer systems are not used in smaller isolated communities where a communications link to the CPU in a metropolitan area is quite expensive and in many instances prohibit use of ATMs. Many such communities still use modernized versions of paper passbook banking and for the foreseeable future it appears that this method of banking will remain as the primary method of doing banking business. In these communities, as well as in metropolitan areas, it would be desirable to revert to more simplified ATMs, namely ones without expensive telecommunications links to a CPU which require data encryption devices. Accordingly, it was an object of the invention to devise a banking card for facilitating electronic passbook banking in cooperation with an ATM, not connected to a remote CPU and without an external data encryption system.

DISCLOSURE OF INVENTION

The above objects have been met with a high information capacity data card for use with a card reader associated with ATMs and similar devices. The data card is a wallet-size card, such as a credit card with a data strip on the card, preferably parallel to the lengthwise dimension of the card. The strip comprises a high resolution, high capacity, reflective laser recording material. The laser recording material is intended as a record for passbook banking. In other words, a passbook type of record will be contained on the strip, with all deposits, withdrawals, interest payments and service charges. This data can be entered by an ATM which reads the strip for user identification and current data, then updates the current data with laser writing.

One of the chief advantages of the present invention is the high information capacity of laser recording media strips. Typically, high resolution laser recording materials record pits having dimensions on the order of several microns or tens of microns. A high capacity laser recording material strip enables a credit card to carry the equivalent of scores of pages of text, more than ample for passbook banking applications, identification and similar uses.

BEST MODE FOR CARRYING OUT THE INVENTION

Figures 1, 2:
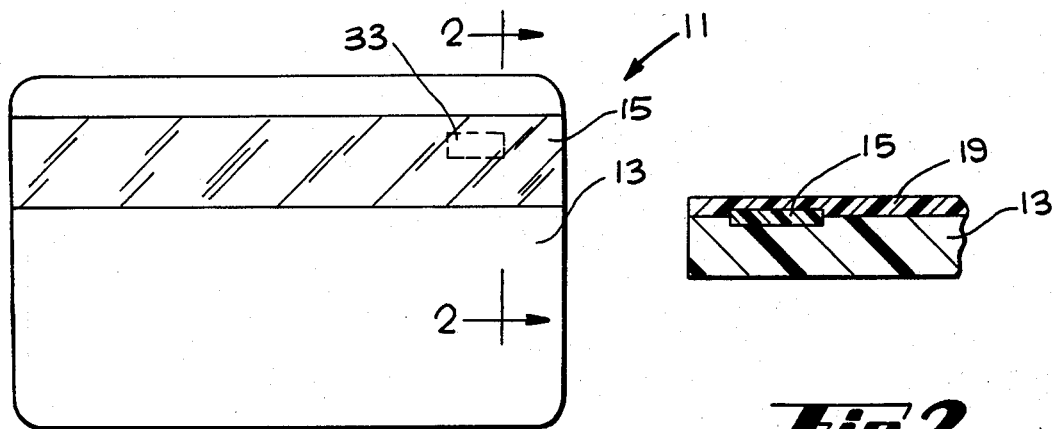
FIG. 1 is a plan view of one side of a data card in accord with the present invention.
FIG. 2 is a partial side sectional view taken along lines 2—2 in FIG. 1.

With reference to FIGS. 1 and 2, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. The surface finish of the base should have low specular reflectivity, preferably less than 10%. Base 13 has a shallow groove which carries strip 15. The strip is about 15 millimeters wide and extends the length of the card. Alternatively, the strip may have other sizes and orientations. The strip is relatively thin, approximately 100–500 microns, although this is not critical. The strip may be applied to the card by any convenient method which achieves flatness. The strip is adhered to the card with an adhesive and covered by a transparent laminating sheet 19 which serves to keep strip 15 flat, as well as protecting the strip from dust and scratches. Sheet 19 is a thin, transparent plastic sheet laminating material or a coating, such as a transparent laquer.

The opposite side of base 13 may have user identification indicia embossed on the surface of the card. Other indicia such as card expiration data, card number and the like may be optionally provided.

The high resolution laser recording material which forms strip 15 may be any of the reflective recording materials which have been developed for use as direct read-after-write (DRAW) optical disks, so long as the materials can be formed on thin substrates. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio with the read/write system with which it is used. A large number of highly reflective laser recording materials have been used for optical data disk applications. Reflectivity should be at least 15% and preferably greater than 25%. Reflectivity of about 50% is preferred with reflectivity of a pit in the reflective material being less than 10%.

Figure 3:
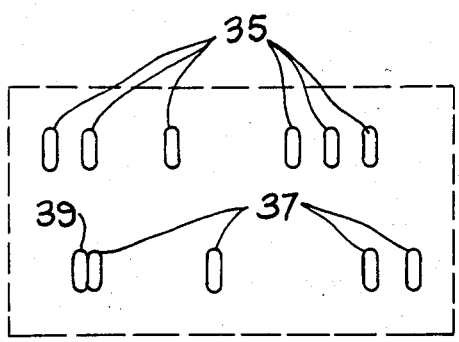
FIG. 3 is a detail of laser writing on a portion of the laser recording strip illustrated by dashed lines in FIG. 1.

With reference to FIG. 3, a magnified view of laser writing on the laser recording material strip 15 may be seen. The dashed line 33, corresponds to the dashed line 33 in FIG. 1. The oblong pits 35 are aligned in a path and have generally similar dimensions. The pits are generally circular or oval in shape with the axis of the oval perpendicular to the lengthwise dimension of the strip. A second group of pits 37 is shown aligned in a second path. The pits 37 have similar dimensions to the pits 35. The spacing between paths is not critical, except that the optics of the readback system should be able to easily distinguish between paths.

Presently, in optical disk technology, tracks which are separated by only a few microns may be resolved. The spacing and pattern of the pits along each path is selected for easy decoding. For example, oval pits of the type shown can be clustered and spaced in accord with self-clocking bar codes. If variations in the dimensions of a pit are required, such dimensions can be achieved by clustering pits, such as the double pit 39. Such variations are used in the ETAB bar code which is described in U.S. Pat. No. 4,245,152. While the American Bankers' Association has not yet adopted any particular code, the strip material is such that many machine and eye readable codes can be accommodated. Some optical codes such as the Universal Product Code are both machine and eye readable. Such codes could also be accommodated, although a great deal more laser writing would be required, than with circular or oval pits, and a much lower information density would be achieved. The pits illustrated in FIG. 3 have a recommended size of approximately 5 microns by 20 microns, or circular pits 5 microns or 10 microns in diameter. Generally, the smallest dimension of a pit should be less than 50 microns. In the preferred embodiment the largest dimension would also be less than 50 microns. Of course, to offset lower densities from larger pits, the size of the strip 15 could be expanded to the point where it covers a large extent of the card. In FIG. 1, the laser recording strip 15 could completely cover a single side of the card. A minimum information capacity of 250,000 bits is indicated and a storage capacity of over one million bits is preferable.

Figure 4:
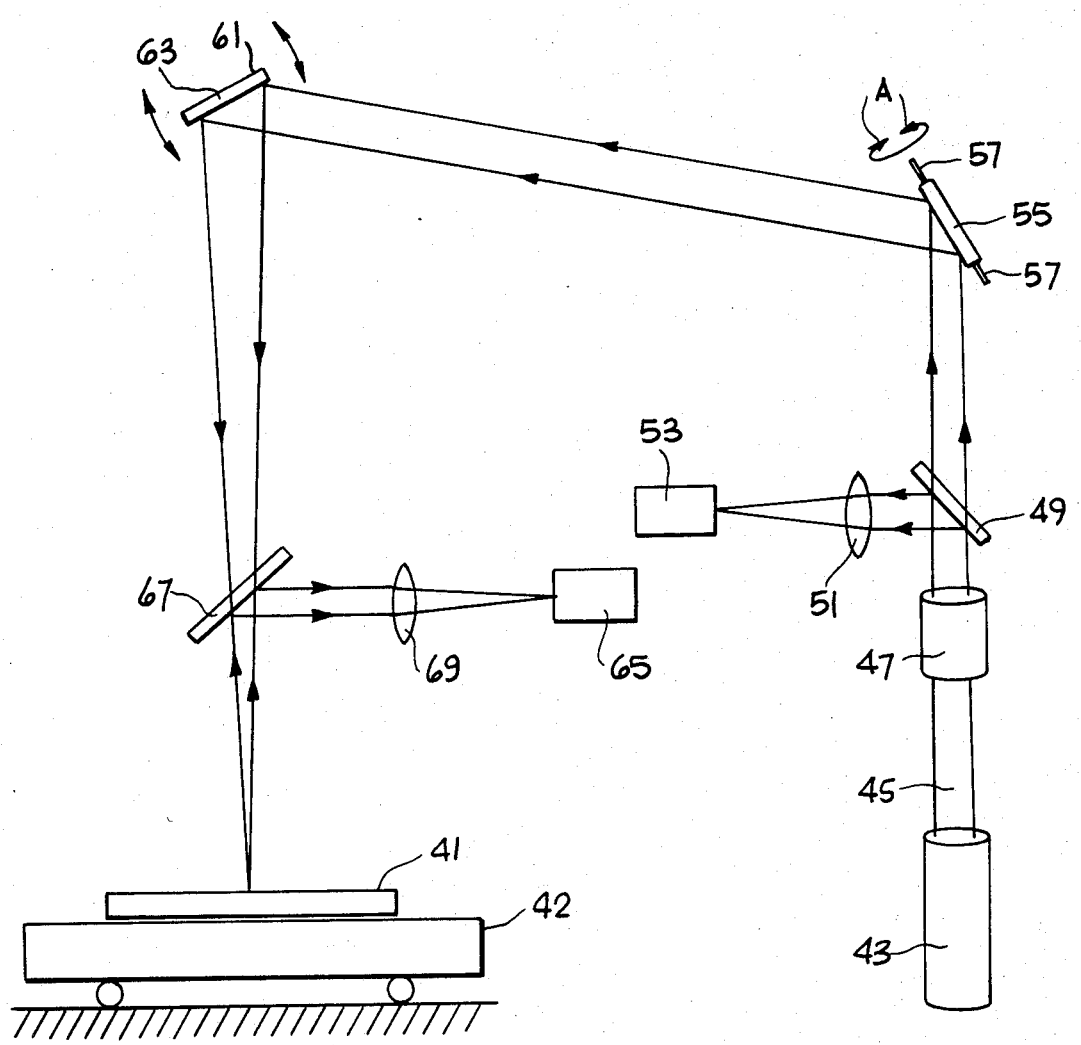
FIG. 4 is a plan view of an apparatus for reading and writing on the optical recording media strip illustrated in FIG. 1.

In FIG. 4, a side view of the lengthwise dimension of a card 41 is shown. The card is usually received in a movable holder 42 which brings the card into the beam trajectory. A laser light source 43, preferably a pulsed semiconductor laser of infrared wavelength emits a beam 45 which passes through collimating and focussing optics 47. The beam is sampled by a beam splitter 49 which transmits a portion of the beam through a focusing lens 51 to a photodetector 53. The detector 53 confirms laser writing and is not essential. The beam is then directed to a first servo controlled mirror 55 which is mounted for rotation along the axis 57 in the direction indicated by the arrows A. The purpose of the mirror 55 is to find the lateral edges of the laser recording material in a coarse mode of operation and then in a fine mode of operation identify data paths which exist predetermined distances from the edges.

From mirror 55, the beam is directed toward mirror 61. This mirror is mounted for rotation at pivot 63. The purpose of mirror 55 is for fine control of motion of the beam along the length of the card. Coarse control of the lengthwise position of the card relative to the beam is achieved by motion of movable holder 42. The position of the holder may be established by a linear motor adjusted by a closed loop position servo system of the type used in magnetic disk drives. Reference postion information may be prerecorded on the card so that position error signals may be generated and used as feedback in motor control. Upon reading one data path, the mirror 55 is slightly rotated. The motor moves holder 41 lengthwise so that the path can be read, and so on. As light is scattered and reflected from the pits, the reflectivity of the beam changes relative to surrounding material where no pits exist. The beam should deliver sufficient laser pulse energy to the surface of the recording material to create pits. Typically, 5–10 milliwatts is required, depending on the recording material. The wavelength of the laser should be compatible with the recording material. In the read mode, power is lowered to about 5% of the record power.

Differences in reflectivity between a pit and surrounding material are detected by light detector 65 which may be a photodiode. Light is focussed onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to pits. These signals are processed and recorded for subsequent display as useful information regarding the transaction recorded on the card.

In operation, the card of the present invention could be used just like a passbook. First the card is read to determine previously recorded information. Next, a user enters his transaction and if validated by an ATM, the ATM then causes data to be written on the first strip by means of the laser. The data represents a passbook entry with a new account status. Operating in this mode, a user may use the card of the present invention in free standing ATMs in isolated locations. While it is necessary for the ATM to make a record of each transaction, there is no need to transmit transaction data using telecommunication links to a CPU at a distant location.

I claim:

1. A system for sequentially recording transaction data by means of a laser comprising, a wallet size card with a transparent plastic laminating material protectively bonded to a strip of high resolution direct-read-after-write reflective laser recording material adhered to one side of the card being laser recordable in place on said card and having a minimal laser recording capacity of 250,000 binary bits, the reflectivity of said strip greater than 25% at near infrared wavelengths and having laser created pits therein, representing transaction data, with a dimension of between several microns and 25 microns and with reflectivity of less than 10%, and laser means having a beam disposed in laser writing relation with respect to said strip for writing said pits, representing transaction data, the pits having a size of between several microns and 25 microns, and a light detector means disposed in reading relation with respect to said strip for reading said pits, and means providing relative motion between the laser beam and the card for sequentially reading transaction data on the card and writing transaction data onto said card in a permanent manner.

2. The system of calim 1 wherein said strip includes previously recorded data bits represented by pits which are oblong and aligned in paths.

3. The system of claim 1 wherein said pits are arranged in a self-clocking bar code.

* * * * *

UNITED STATES PATENT AND TRADEMARK OFFICE
CERTIFICATE OF CORRECTION

PATENT NO.   : B1-4,500,777
DATED        : November 24, 1992
INVENTOR(S)  : Jerome Drexler It is certified that error appears in the above-indentified patent and that said Letters Patent is hereby corrected as shown below:

Title page, Item [63] Related U.S. Application Data, "Continuation of Ser. No. 492,691, May 11, 1983, which is a continuation of Ser. No. 238,833, Feb. 22, 1981, abandoned" should read - - Continuation of Ser. No. 492,691, May 11, 1983, which is a continuation of Ser. No. 238,833, Feb. 27, 1981, abandoned. - -.

Signed and Sealed this

Twenty-second Day of March, 1994

Attest:

BRUCE LEHMAN

Attesting Officer     Commissioner of Patents and Trademarks

REEXAMINATION CERTIFICATE (1851st)

United States Patent [19]

Drexler

[11] B1 4,500,777

[45] Certificate Issued Nov. 24, 1992

[54] HIGH DATA CAPACITY, SCRATCH AND DUST RESISTANT, INFRARED, READ-WRITE DATA CARD FOR AUTOMATIC TELLER MACHINES

[75] Inventor: Jerome Drexler, Los Altos Hills, Calif.

[73] Assignee: Drexler Technology Corporation

Reexamination Request:
No. 90/001,911, Dec. 21, 1989

Reexamination Certificate for:
Patent No.: 4,500,777
Issued: Feb. 19, 1985
Appl. No.: 566,966
Filed: Dec. 29, 1983

Related U.S. Application Data

[63] Continuation of Ser. No. 492,691, May 11, 1983, which is a continuation of Ser. No. 238,833, Feb. 22, 1981, abandoned.

[51] Int. Cl.⁵ .................. G06K 19/00; G06K 1/00; G06K 7/10
[52] U.S. Cl. .................. 235/487; 235/382.5; 235/468; 235/488; 283/86; 283/904
[58] Field of Search .................. 235/379; 902/25, 27

[56] References Cited

U.S. PATENT DOCUMENTS

| | | | |
|---|---|---|---|
| 3,648,020 | 3/1972 | Tateisi et al. | 902/27 X |
| 3,795,902 | 3/1974 | Russell . | |
| 3,919,447 | 11/1975 | Kilmer, Jr. et al. | 428/138 |
| 3,947,661 | 3/1976 | Silverman et al. | 236/61.7 R |
| 4,114,027 | 9/1978 | Slater et al. | 235/379 |
| 4,216,501 | 8/1980 | Bell | 358/128.5 |
| 4,222,071 | 9/1980 | Bell et al. | 358/128.5 |
| 4,230,939 | 10/1980 | de Bont et al. . | |
| 4,245,152 | 1/1981 | Flurry et al. . | |
| 4,270,130 | 5/1981 | Houle et al. | 346/77 E |
| 4,380,769 | 4/1983 | Thomas et al. | 346/135.1 |

FOREIGN PATENT DOCUMENTS

55-4724 1/1980 Japan .

OTHER PUBLICATIONS

"Digital Recording, an optical system for high density information storage and retrieval" by Digital Recording Corporation, Wilton, CT (undated).

*Primary Examiner*—John W. Shepperd

[57] ABSTRACT

A data card having an optical, high resolution reflective laser recording material, such as a metallic film adhered thereon. The strip of laser recording material has a capacity for recording at least 250,000 bits represented by bits having a dimension less than 50 microns. The data card is used in electronic passbook banking or identification uses.

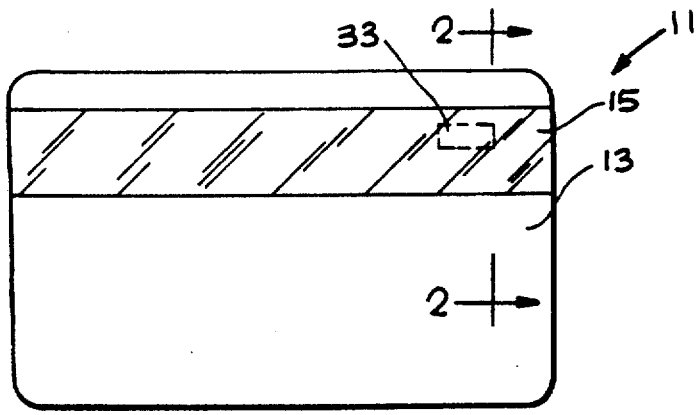

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2 and 3, dependent on an amended claim, are determined to be patentable.

1. A system for sequentially recording transaction data by means of a laser comprising,
   a wallet size card with a transparent plastic laminating material protectively bonded to a strip of high resolution direct-read-after-write reflective laser recording material adhered to one side of the card being laser recordable in place on said card and having a minimal laser recording capacity of 250,000 binary bits, the reflectivity of said strip greater than 25% at near infrared wavelengths and having laser created pits therein, representing transaction data, with a dimension of between several microns and 25 microns and with reflectivity of less than 10%, and
   *a plurality of stand alone terminal means independent of a central data store, said terminal means for reading and writing transaction data on a card whereby a card contains a complete record of previous transactions, each terminal comprising,*
   laser means having a beam disposed in laser writing relation with respect to said strip for writing said pits, representing transaction data, *said transaction data being data updating previously recorded data without erasing said previously recorded data,* the pits having a size of between several microns and 25 microns, [and]
   a light detector means disposed in reading relation with respect to said strip for reading said pits, and
   means providing relative motion between the laser beam and the card for sequentially reading *previously recorded* transaction data on the card and *positioning the beam and the card for* writing transaction data onto said card in a permanent manner.

* * * * *